J. T. P. HUNT.
Street Gas Lamp Post.
No. 45,717.
Patented Jan. 3, 1865.
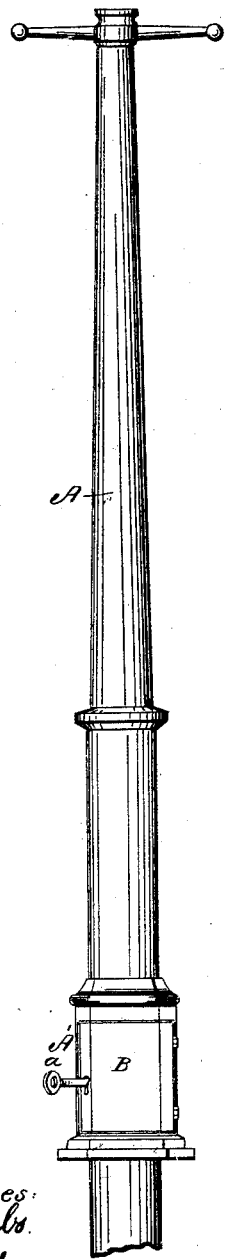
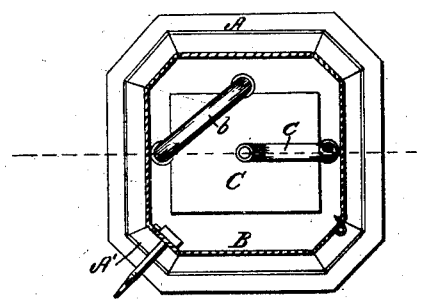
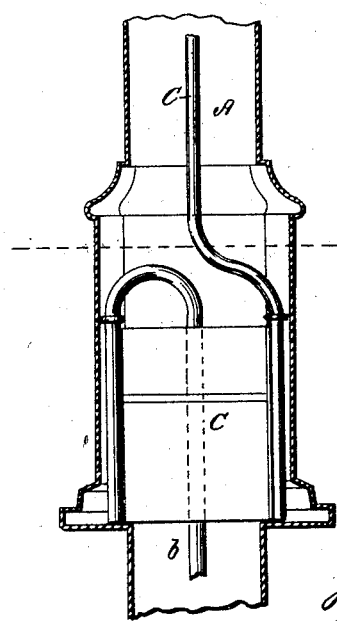

UNITED STATES PATENT OFFICE.

J. T. P. HUNT, OF MANCHESTER, NEW HAMPSHIRE.

IMPROVEMENT IN STREET GAS-LAMP POSTS.

Specification forming part of Letters Patent No. 45,717, dated January 3, 1865.

*To all whom it may concern:*

Be it known that I, J. T. P. HUNT, of Manchester, in the county of Hillsborough and State of New Hampshire, have invented a new and Improved Street Gas-Lamp Post; and I do hereby declare that the following is a full, clear, and exact description thereof, which will enable any person skilled in the art to make and use the same, reference being had to the accompanying drawings, in which—

Figure 1 is a side elevation of my improvement; Fig. 2, a partial sectional elevation of the same; Fig. 3, a horizontal sectional plan of the same.

Similar letters of reference indicate the same parts.

The object of this invention is to provide a means for the location of a gas-meter in a lamp-post, with facilities for reaching the same for examination, removal, or repairs; and it consists in making an enlargement in the base or other portion of the lamp-post, and providing the same with a door and fastening by which the interior may be reached, and furnished with a meter for the measurement of the gas used by the burner or burners appertaining to that lamp-post.

A represents the lamp-post, which is hollow, constructed of metal in the ordinary manner and form, but having one side of its base A' made with an opening, which is covered and protected by a door, B, which is fastened by a lock and key, $a$. The base of the hollow lamp-post, A', thus forms a chamber, to which convenient access is had through the door B. Within this chamber I arrange a gas-meter, C, of the ordinary construction, either of the wet or dry kind, furnished with the usual registering-indices, and having a service-pipe, $b$, intended to connect with the street-main, and a pipe, $c$, leading up from the meter C to the gas burner, which is placed in the usual manner at the top of the lamp-post.

For ordinary uses the dry meter will be preferable, on account of its non-liability to freezing in winter.

By the use of my improvement the exact amount of gas consumed by street lamps or burners placed upon solitary posts or standards may at all times be known by examining the indices pertaining to the meter contained within the post or standard of such lamps.

The meter may be arranged at any other convenient point within or upon the lamp post or standard, and the form of the meter may be varied so as to suit or fit any required position.

Having thus described my invention, I claim as new and desire to secure by Letters Patent—

Constructing a lamp-post, with an enlargement for the location of a gas-meter, with a door and fastening, as described, as a new article of manufacture.

J. T. P. HUNT.

Witnesses:
  L. B. CLOUGH,
  J. B. SAWYER.